July 1, 1969  D. LEJEUNE  3,453,008

COUPLINGS FOR PIPES AND HOSES

Filed March 14, 1967

INVENTOR
DANIEL LEJEUNE
BY

HIS ATTORNEYS

United States Patent Office 3,453,008
Patented July 1, 1969

3,453,008
COUPLINGS FOR PIPES AND HOSES
Daniel Lejeune, Clermont-Ferrand, France, assignor to Compagnie Generale des Etablissements Michelin, raison sociale Michelin & Cie, Clermont-Ferrand (Puy-de-Dome), France
Filed Mar. 14, 1967, Ser. No. 623,019
Claims priority, application France, Mar. 25, 1966, 55,119
Int. Cl. F16l 39/02, 11/08, 59/16
U.S. Cl. 285—149                     6 Claims

ABSTRACT OF THE DISCLOSURE

The invention relates to couplings for hoses of the type having reenforcing plies of cords or cables interposed between and united with a sheath layer and a lining layer of an elastomer and in which the coupling comprises a pair of annular bolt-receiving flange rings on opposite sides of outwardly bent end portions on the reenforcing plies and vulcanized to the plies and to the sheath and liner of the hose.

---

Figure 1:
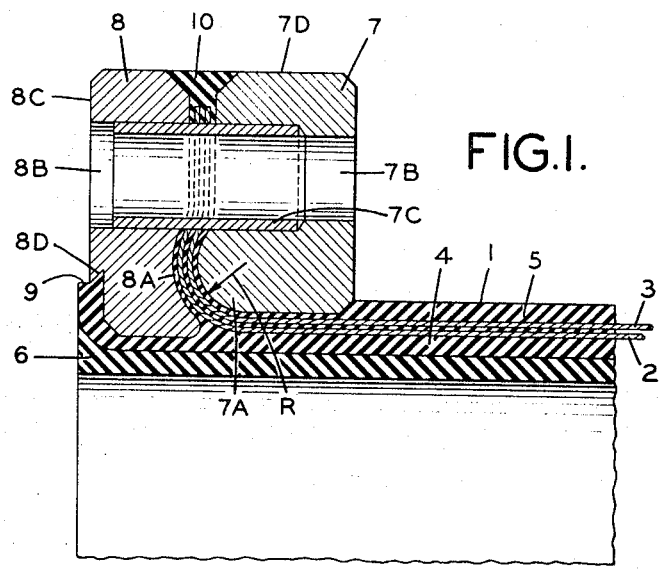

The present invention relates to improvements in flexible hoses or pipes and the couplings therefor, and more particularly to hoses or pipes containing one or more reenforcing plies of metallic cables or cords which may attain and exceed 600 mm. in diameter, and to couplings by means of which sections of such hoses or pipes can be connected in end-to-end relation.

Rubber or plastic hoses or pipes are usually connected by means of metal flanges at the ends of the pipes or by threaded couplings which include a tubular sleeve portion inserted in the end of the hose and provided with ribs or corrugations to retain the coupling in the end of the hose. The length of this insert portion must be increased with the diameter of the pipe. These couplings have several disadvantages, namely, the presence of the tubular sleeve portion on the coupling stiffens the hose adjacent to the coupling and the coupling can be disengaged from the hose or pipe by moderate tension stresses or pressures.

Another type of coupling includes a bead formed on the end of the pipe or hose by folding back the reenforcing plies around a rod or core and using this bead as a sealing ring and securing means for a flange which has been slipped over the pipe or hose prior to the formation of the bead. This structure also renders the end of the hose or pipe rigid for the reason that it doubles the number of armor or reinforcing plies at the end portion of the hose.

In accordance with the present invention, a coupling is provided for pipes or hoses reenforced by cord plies which reduces stiffening or rigidifying of the hose to a minimum and at the same time provides a structure which is highly pressure- and stress-resistant so that unintentional detachment of the coupling is avoided.

More particularly, hoses or pipes of the type to which the new coupling is applied include one or more layers of metallic cords or cables in the form of plies which are covered by a sheath of elastomer and an inner layer of an elastomer which further may be provided with a lining of the same or different type of elastomer resistant to the liquid or gas being conducted through the pipe or hose. In forming the coupling, the portion of the plies adjacent the end of the pipe or hose are separated from the sheath and the inner lining and the plies are bent outwardly generally radially and disposed between a pair of annular metal rings or flange portions provided with opposed complementally corrugated surfaces between which the plies are gripped and shaped. Prior to engagement of the plies with the rings or flange portions, one or both are treated to render them susceptible to vulcanizing as are the inner peripheries of the rings or flange portions so that the sheath and the internal layer or layers of the hose can be bonded or vulcanized to the inner peripheries of the rings and the reenforcing plies vulcanized or bonded to the opposed faces of the flanges whereby a pressure-resistant and tension-resistant union is obtained between them. With this arrangement of the coupling, the hose is stiffened only throughout the length occupied by the flanges and the flanges form in effect a continuation or an integral part of the hose or pipe so that pressure within the pipe or tension stresses exerted lengthwise of the pipe are resisted to a maximum extent.

Modifications of the coupling are possible as, for example, by providing bolt holes through the flanges and sleeves extending between the flange portions to align them and reduce leakage, and the inner liner or layer of the hose may be extended beyond the end of the outermost flange portion and vulcanized thereto, to form a sealing gasket or washer for reducing leakage between adjacent hose coupling connected in end-to-end relation.

Figure 2:
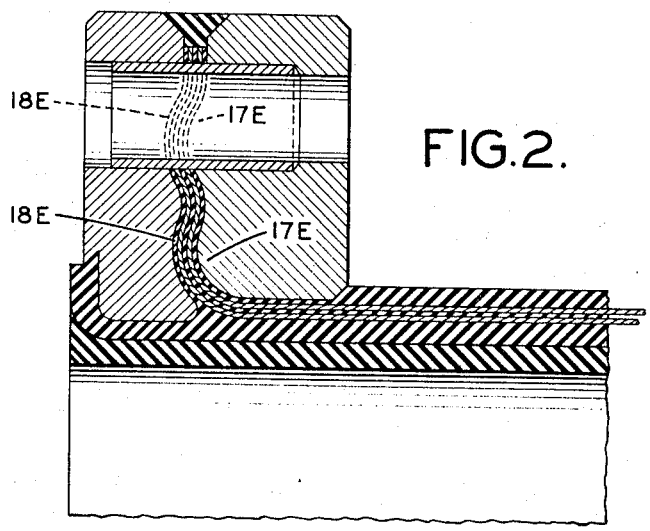

For a better understanding of the present invention, reference may be had to the accompanying drawings, in which FIGURE 1 is a view in longitudinal section through a portion of a hose having a coupling of the type embodying the present invention; and FIGURE 2 is a view in longitudinal section through a portion of a hose having a modified form of coupling thereon.

As shown in FIGURE 1, a flexible pipe or, as referred to hereinafter, a hose 1 is reenforced by means of two metal cords or cable plies arranged between an inner layer 4 of a suitable elastomer and the sheath 5, also formed of a suitable elastomer. The elastomers may be natural or synthetic rubber or vulcanizable or heat cementable plastic. Also, the hose can be provided with a liner 6 consisting of an elastomer having a composition which is resistant to the fluid to be conveyed through the hole.

The coupling for this pipe, in accordance with the present invention, comprises a metal flange consisting of two rings 7 and 8 having complementally shaped opposing faces capable of being fitted together and between which the reenforcing plies 2 and 3 are received. The ring 7 has a circular rib 7A of arcuate cross-section having a radius R of greater or lesser length, depending on the flexibility of the plies 2 and 3. A radius R of 10 to 20 mm. is suitable in most instances. The element 8 has a complemental annular recess 8A in its face, also curved on a similar radius. The curvatures of the rib and recess should be such that the reenforcing plies are not unduly stressed or bent too sharply, to avoid weakening of the plies.

A series of bolt-receiving holes 7B and 8B, respectively, are provided in the flange rings 7 and 8 and are spaced apart concentrically around the axis of the ring to enable the flange on one hose section to be bolted to a corresponding flange on another hose section. The surfaces of the rings 7 and 8 which engage the pipe 1 and the reenforcing plies 2 and 3 are treated to enable the rings to be bonded or vulcanized securely to the metal or elastomer of which the pipe is composed. For example, the rings 7 and 8 may be brass-plated to facilitate vulcanizing to rubber or the like, and rubber glues may be applied to the ring surfaces and to the outer surfaces of the reenforcing plies 2, 3, the sheath 6 and the layer 4. In order to protect the reenforcing plies gripped between the rings 7 and 8 against infiltration of moisture through the bolt-receiving holes 7B and 8B, each of these holes, for example, the holes of the element 7, receives a rigid insert sleeve which at least in part enters the holes of the opposite ring. The outer ring 8 has in its outer surface 8C an annular recess 8D undercut at its outer edge wherein the outer end portion of the layer 4 is received to form an extension serving as a sealing joint or gasket between the flanges of two successive hose sections.

As indicated above, the reenforcing plies 2 and 3 are bent outwardly against the face of the ring 7 and preferably stop a little short of the outer edge of rim 7D of the ring 7. To facilitate folding of the plies 2 and 3, they may be split longitudinally preferably between contiguous cables a short distance to form separable segments disposed between the bolt-receiving holes 7B and 8B and the insert sleeves 7C. After the reenforcing plies 2 and 3 are folded against the surface or face of the ring 7, the element 8 which is of less internal diameter than the ring 7 is slipped over the outer end portion of the layer 4 and the liner 6 and forced against the folded back portions of the plies 2 and 3. The protruding outer end portions of the layer 4 and the liner 6 are pressed into the recess 8D in the outer face of the flange 8.

A filling of rubber or similar material 10 is introduced between the rings 7 and 8 at their peripheries to fill the gap around the outer edges of the folded back plies in order to prevent entry of moisture. After assembly of the components, they are vulcanized under pressure in a known way to bond the sheath 5, the plies 2 and 3, the liner 6 and layer 4, the rings 7 and 8 and the insert sleeves 7C into a unitary structure. The ring 7, which is slipped over the end portion of the sheath 5, is bonded thereto by vulcanizing.

The coupling is susceptible to modification, for example, as shown in FIGURE 2. In this form of the invention, the flange rings 17 and 18 include two arcuate cross-section ribs 17E and two complemental arcuate cross-section recesses 18E in the opposing faces of the ring. The use of two ribs improves the holding power or tension-resistance of the connection between the flange rings and the reenforcing plies, and also renders the flange highly resistant to twisting forces and torque.

Inasmuch as the flange rings are devoid of sleeves extending lengthwise of the hose and the reenforcing plies are not doubled back on the hose to form a retaining bead, the hose is stiffened only throughout the combined thicknesses of the flange rings 7 and 8 or 17 and 18. Consequently, the ends of the hose, particularly large diameter sizes of hoses, are more flexible than prior hoses and have enhanced resistance to stresses of all types due to the vulcanized and clamping connection between the components of the hose, that is the ply, sheath and lining and the flange rings mounted thereon. It will be clear that when hose sections lining the new couplings thereon and bolted together, the reenforcing plies are gripped even tighter between the rings of the couplings and are, accordingly, less susceptible to slippage.

The hose and coupling are susceptible to modification, for example, the number of reenforcing plies may be other than two, as illustrated, the cords or cables may be composed of textile or other non-metallic materials, the sheath and inner liner or layer may be composed of different types of elastomers and the arrangement of the cables in the plies can be varied. Accordingly, the forms of the invention described herein should be considered as illustrative.

I claim:

1. A coupling for hoses containing a plurality of plies of reenforcing metallic cords and a sheath and an inner layer of an elastomer comprising a pair of substantially coaxial flange rings having inner peripheries and inner and outer radial surfaces, said inner periphery of one ring being bonded to said sheath, and said inner periphery and a portion of the outer radial surface of the other ring being bonded to said inner layer at one end of said hose, a portion of said plies at said one end of said hose extending laterally between and being bonded to said rings, further comprising at least one rib on the inner radial surface of one of said flange rings engaging one side of said portion of said plies, and a complemental groove in the inner radial surface of the other flange ring engaging the other side of said portion of said plies, said rib and groove bending said portion of said plies into conformity therewith, and the surfaces of said rings engaging said plies extending generally in planes normal to the axis of said rings and said portion of said plies being separated from said inner layer by said other ring.

2. The coupling set forth in claim 1 comprising a plurality of ribs on one of said flange rings engaging one side of said ply portion and a plurality of complemental grooves in the other flange ring engaging the other side of said ply portion, said ribs and grooves bending said ply portion into conformity therewith.

3. The coupling set forth in claim 1 in which said other ring comprises an annular recess in said outer surface and said inner layer of elastomer having an end portion extending laterally into said recess and bonded to said other ring.

4. The coupling set forth in claim 3 in which said end portion of said inner layer extends outwardly beyond said outer surface of said other ring.

5. A coupling for hoses containing at least one ply of reenforcing cords and a sheath and an inner layer of an elastomer comprising a pair of substantially coaxial flange rings having inner peripheries, said inner periphery of one ring being bonded to said sheath, and said inner periphery of the other ring being bonded to said inner layer at one end of said hose, a portion of said ply at said one end of said hose extending laterally between and being bonded to said rings, further comprising at least one rib on one of said flange rings engaging one side of said ply portion, and a complemental groove in the other flange ring engaging a portion of the other side of said ply portion, said rib and groove bending said ply portion into conformity therewith, and the surfaces of said rings engaging said ply extending generally in planes normal to the axis of said rings, and further comprising means forming aligned bolt-receiving holes in said flange rings extending substantially parallel with the axis of said flange rings and tubular inserts in said holes.

6. A coupling for hoses containing at least one ply of reenforcing cords and a sheath and an inner layer of an elastomer comprising a pair of substantially coaxial flange rings having inner peripheries, said inner periphery of one ring being bonded to said sheath, and said inner periphery of the other ring being bonded to said inner layer at one end of said hose, a portion of said ply at said one end of said hose extending laterally between and being bonded to said rings, further comprising means forming aligned bolt-receiving holes in said flange rings extending substantially parallel with the axis of said flange rings and tubular inserts in said holes, said ply portion comprising a plurality of substantially radial, interconnected segments interposed between said tubular inserts and comprising sealing means between said flange rings outwardly of said segments.

References Cited

UNITED STATES PATENTS

| 2,146,218 | 2/1939 | Kimmich et al. | 285—149 |
| 2,809,056 | 10/1957 | Kaiser | 285—149 |
| 2,940,778 | 6/1960 | Kaiser | 285—149 X |
| 3,204,989 | 9/1965 | Wilson | 285—363 X |
| 2,220,785 | 11/1940 | Goodall | 285—149 |

FOREIGN PATENTS

| 954,051 | 4/1964 | Great Britain. |
| 969,956 | 9/1964 | Great Britain. |
| 546,837 | 8/1956 | Italy. |

THOMAS F. CALLAGHAN, *Primary Examiner.*

U.S. Cl. X.R.

138—109; 285—55, 405